United States Patent [19]

Critelli

[11] Patent Number: 5,581,012

[45] Date of Patent: Dec. 3, 1996

[54] DIMENSIONAL MEASUREMENT METHOD AND REFERENCE SAMPLE FOR CARRYING OUT THE METHOD

[75] Inventor: Antonio Critelli, Turin, Italy

[73] Assignee: Rosfer Engineering Sas di Critelli Antonio e C., Turin, Italy

[21] Appl. No.: 348,296

[22] Filed: Dec. 2, 1994

[30] Foreign Application Priority Data

Dec. 21, 1993 [IT] Italy .................................. TO93A0971

[51] Int. Cl.⁶ .......................... G01D 3/036; G01D 18/00; G01B 3/30
[52] U.S. Cl. ................. 73/1 J; 33/502; 33/545; 33/567; 33/702
[58] Field of Search ................... 73/1 J; 33/502, 33/702, 567, 567.1, 545

[56] References Cited

U.S. PATENT DOCUMENTS

| | | | |
|---|---|---|---|
| 2,772,483 | 12/1956 | Gierlich | 33/567 |
| 2,918,727 | 12/1959 | Genetti | 33/567 |
| 3,956,092 | 5/1976 | Kampe et al. | 33/567 X |
| 4,926,565 | 5/1990 | Kümmerer | 33/567 |
| 4,932,136 | 6/1990 | Schmitz et al. | 73/1 J X |
| 4,949,469 | 8/1990 | Wachtler | 33/555.1 |
| 4,962,591 | 10/1990 | Zeller et al. | 73/1 J X |
| 5,031,331 | 7/1991 | Herzog et al. | 33/702 X |
| 5,257,460 | 11/1993 | McMurtry | 33/545 X |
| 5,272,120 | 12/1993 | Kosuda et al. | 33/DIG. 11 X |
| 5,426,861 | 6/1995 | Shelton | 33/545 X |

FOREIGN PATENT DOCUMENTS

| | | | |
|---|---|---|---|
| 3806791 | 4/1989 | Germany | 33/567 |
| 3823684 | 5/1989 | Germany | 33/502 |
| 193003 | 8/1986 | Japan | 73/1 J |
| 201119 | 8/1989 | Japan | 73/1 J |
| 845994 | 7/1981 | U.S.S.R. | 73/1 J |

OTHER PUBLICATIONS

Definition of preprog; p. 1173 of the McGraw–Hill Technical Dictionary (Italian Edition, Zanichelli 1991).

4 page Brochure from Bio–Rad Microscience Division "Diode Sputter Coaters How to Select the System to Suit Your Needs" published by, Dec. 1995.

4 page Brochure from VG Microtech Fisons Instruments "Carbon Coaters E 6200 Turbo Pumped/ TB500 " published by Dec. 1995.

*Primary Examiner*—Thomas P. Noland
*Attorney, Agent, or Firm*—Sughrue, Mion, Zinn, Macpeak & Seas

[57] ABSTRACT

A method for the dimensional measurement of a piece to be checked is disclosed, wherein a comparison sample and a reference sample are employed, respectively, of a material which is coherent with that of the piece to be checked and of a material having a low thermal expansion coefficient. Through the comparison between the two samples the relative thermal expansion is determined, and same is then related to the measurements carried out on the piece to be checked so as to determine the dimensions thereof as if the measurement were performed in a controlled temperature environment. The reference sample for carrying out the method is preferably made of a composite material.

14 Claims, 1 Drawing Sheet

DIMENSIONAL MEASUREMENT METHOD AND REFERENCE SAMPLE FOR CARRYING OUT THE METHOD

BACKGROUND OF THE INVENTION

The present invention is related to measurement methods wherein a dimensional entity of a piece to be checked is measured, and the measured value is then compared with the value of a corresponding dimensional entity of a reference sample, so as to detect a deviation value, if any.

In metrological applications there is the need of providing systems which may improve the resolution and the accuracy of the measurements. A further relevant requirement is the capability of reproducing a measurement: this enables, for a given reference sample, to read again, under determined physical and environmental outline conditions, the characteristics of the sample itself with a known uncertainty.

Thus, for example, between the institutes which are part of B.I.P.M. (Bureau International des Poids et Misures) and the qualified laboratories, "circulating samples" are circulated, the aim of which is to evaluate the capability of the laboratories to reproduce the peculiar magnitudes of the sample.

In general the total uncertainty in the measurement of a sample is dependent upon the contribution of each component intervening in the measurement process, in accordance with known relationships.

For sure a fundamental component intervening in the measurement process is the temperature. Variations of one degree of temperature on a sample having a length of 100 mm, made of steel, lead to an elongation of 0.00115 mm. These variations occur according to typical paths of the heat transmission with various time constants, depending upon the physical-environmental characteristics of the laboratory.

Extending the latter considerations to different environments other than a laboratory, such as for instance a workshop within the frame of product quality testing; it can be realised how critical is the temperature factor wherever the variations thereof are well over one degree.

It is known that percentage tests, which are meaningful in connection with workpieces, are carried out within production environments, either manually or automatically.

It is also known that these tests are carried through on related instruments comparing the measurement made on the piece with that cyclically made on comparison samples which the instruments are equipped with. These samples, defined also as "zero-setting samples", are intended to define, accomplish, store or reproduce one or more known value in order to transmit same by comparison to others. Now, since the zero-setting sample is certified under a temperature of 20° C. on nominal values, according to the traditional dimensional measurement methods the relative measurements are compared under the hypothesis that the pieces which are subjected to testing and the zero-setting sample have the same thermal expansion coefficient.

EP-A-0498780 discloses a method and arrangement for determining and compensating for linear heat expansion of elongated bodies, such as physical length scales and the like in instruments and measuring machines in which measurement errors occur because of length deviations caused by deviations from a reference temperature at which the length of the body was calibrated. This method and arrangement are also based upon measuring the linear expansion of the body in relation to a reference made of a material whose coefficient of linear heat expansion deviates from the coefficient of linear heat expansion of the body material, and thereafter determining, when appropriate, a compensation factor for correcting the body length to be determined.

This is what is presently provided for in the state of the prior art of workshop metrology. The apparatus employed therefor are normally based upon computerised systems, the software of which may also contemplate implementations which take into account the temperature trend. However, these expedients are in general not completely reliable, and due to this reason in practice, some are not suitable for use in workshop environments.

SUMMARY OF THE INVENTION

The object of the present invention is to provide a measurement method of the type set forth at the beginning, which enables to overcome the above drawbacks and allows a new simplified approach, both in the comparison measurement and in the absolute measurement, even within environments where the temperature is not controlled.

According to the invention, a method for dimensional measurement of the type defined at the beginning is essentially characterized in that the comparison sample is of a material coherent with that of the piece to be checked and having substantially the same thermal expansion coefficient, and in that the method further comprises the steps of:

providing a reference sample constituted by a material having a low thermal expansion coefficient, substantially negligible along the direction of the dimensional entity to be measured, measuring the corresponding dimensional entity of said reference sample so as to obtain a substantially absolute measurement value, comparing said substantially absolute measurement value with the measured value of said comparison sample and determining from this comparison a parameter which is indicative of the relative thermal expansion, employing this parameter for correcting said deviation, if any, between the values of the measured dimensional entities of the piece to be checked and of the comparison sample, respectively.

In practice, the method according to the invention is based upon a "dual comparison" measuring methodology through which, by comparing the comparison sample and the low thermal expansion coefficient reference sample, the relative expansion can be detected and the same is then related to the readings which can be executed on the pieces to be checked, so as to deduce the dimension thereof as if it were performed at 20° C., under a controlled temperature environment.

The measurement method according to the invention makes the production processes more stable from the dimensional point of view, limiting drifting thereof and appreciably reducing the check time (reduction of the stabilisation time and of transfer of personnel and equipment to controlled temperature rooms, etc.).

Remarkable benefits may be achieved for zero-settings and linearisations of optical instruments or instruments provided with linear encoders. Further benefits can evidently be obtained in the case of dimensional laboratory comparisons.

The material of the reference sample for carrying out the method according to the invention can be a metal denominated "INVAR" (metal alloys having a nickel contents of 37%), or quartz, or more conveniently a composite material including a polymeric resin matrix and stratified carbon fibers.

The resin is conveniently an epoxy resin, and the fibers of the stratified layers may have different angles of orientation, conveniently angularly offset of 10° between each layer and the adjacent one, between 0° and 90°.

To the aim of ensuring a high surface hardness in the contact areas, as well as a high abrasion resistance, the block of the reference sample is conveniently subjected to a surface coating treatment, consisting of a coating of ceramic materials or of pure graphite, or even of a fluorocarbon resin such as polytetrafluoroethylene, for a thickness of a few tenths of millimeter.

BRIEF DESCRIPTION OF THE DRAWINGS

The invention will now be disclosed in detail with reference to the accompanying drawings, purely provided by way of non limiting example, which show diagrammatically different envisageable typologies of the reference sample employed in the measurement method. In particular.

DETAILED DESCRIPTION OF THE INVENTION

The dimensional measurement method based upon the principle of "dual comparison" according to the invention provides the co-existence of two zero-setting samples, both having a geometrical configuration same as that of the piece to be checked. The first sample, designated as "comparison sample", is made of a material which is coherent with that of the pieces to be checked, and having substantially the same thermal expansion coefficient.

The term "coherent" is intended to be used in the present specification according to the general meaning of this term in the field of metrology. More particularly, in connection with thermal properties, the term "coherent" as used herein also specifically means that the "comparison sample" has the same thermal capacity (in terms of material composition and/or size and/or shape) as the workpiece to be verified.

The second sample, designated as "reference sample", is made of a material having an extremely low coefficient of thermal expansion, which is in practice negligible in the direction of the dimensional entity to be measured.

With the aid of conventional measuring apparatus, within the knowledge of the men skilled in the art and thus for brevity not disclosed in detail, the dimensional entity (normally a length) of the piece to be checked is measured, and the measured value is compared with the value of the corresponding dimensional entity of the comparison sample, so as to reveal any deviation value, The value of the dimensional entity of the comparison sample is then compared with the value of the corresponding dimensional entity of the reference sample, which corresponds to a substantially absolute measurement value since it is not affected by the environmental temperature.

Following this comparison, a parameter indicative of the relative thermal expansion of the comparison sample is determined, and this parameter is employed for correcting the deviation, if any, detected between the measured values of the dimensional entities of the piece to be checked and the comparison sample. In practice, therefore, through the comparison between the two samples the relative thermal expansion can be revealed and same can be related to the readings made on the pieces to be checked, so as to deduce the dimension thereof as if it were performed in a 20° C.—controlled temperature environment.

The annexed figures show diagrammatically different possible typologies of the reference sample.

Figure 1:
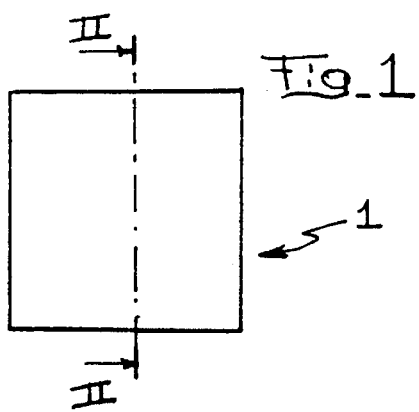
FIG. 1 is a diagrammatic front elevational view of a first reference sample shaped as a plane-parallel block.
Figure 2:
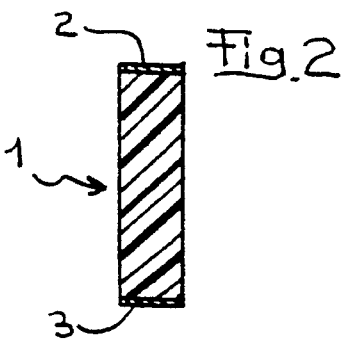
FIG. 2 is a sectioned view along line II—II of FIG. 1.

In the case of FIGS. 1 and 2, the reference sample is constituted by a quadrangular block, having plane and parallel faces, preferably constituted by a composite material including a polymeric resin matrix incorporating stratified carbon fibers, according to the manufacturing technology which will be disclosed hereinafter.

The surfaces of contact between the block 1 and the measurement apparatus, which are constituted in the present instance by the upper and lower lateral faces, are coated with thin layers 2, 3 of a material having a high surface hardness and a high abrasion resistance. This material, whose thickness may be in the order of a few tenths of millimeter, can be a ceramic material (such as $CR_2 O_3$, $Zr O_2$, etc.), or pure graphite, or even a fluorocarbon resin such as polytetrafluoroethylene, applied by means of conventional surface coating methods.

Figure 3:
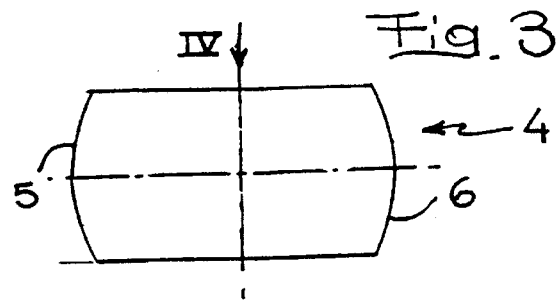
FIG. 3 shows in elevation a second reference sample for the checking of outer diameters.
Figure 4:
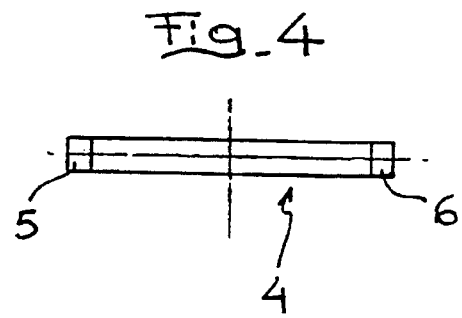
FIG. 4 is a top plan view according to arrow IV of FIG. 3.

The second reference sample designated as 4 in FIGS. 3 and 4 is formed by a plate made of the same composite material, having two convex opposite sides 5, 6, with a circular arc profile, the surface of which is coated with the same previously disclosed materials having a high surface hardness and a high abrasion resistance. The reference sample 4 is intended to be used for checking outer diameters.

Figure 5:
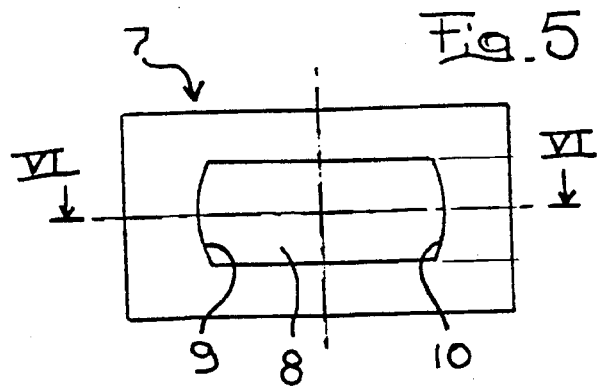
FIG. 5 is an elevational view of a third reference sample for the checking of inner diameters.
Figure 6:
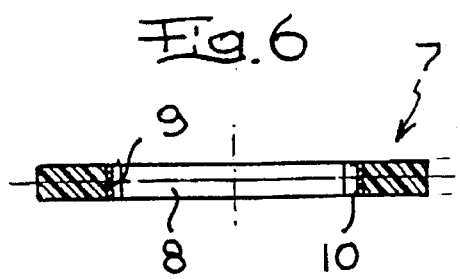
FIG. 6 is a sectioned view along line VI—VI of FIG. 5.

The third reference sample, indicated as 7 in FIGS. 5 and 6, is generally shaped as a quadrangular plate have a central opening 8 with two concave opposite sides 9, 10 with a circular arc geometrical shape. Also in this case the plate 7 is made of the same composite material, and the surfaces 9 and 10 are coated with the same material having high hardness and abrasion resistance.

Figure 7:
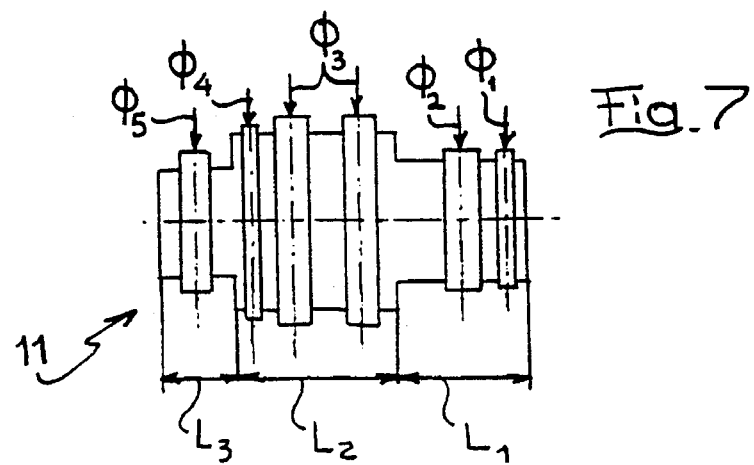
FIG. 7 is an elevational view of a fourth reference sample for the checking of diameters and shoulders.

Lastly, the fourth reference sample indicated as 11 in FIG. 7 is formed with lateral cylindrical surfaces and plane front surfaces for controlling diameters $\Phi_1 \ldots \Phi_5$ and shoulders $L_1 \ldots L_3$. Even in this case the body of the reference sample 11 is made of the same composite material, and the lateral and front contact surfaces are coated with the same material having high hardness and resistance to abrasion.

The composite material of epoxy resin-carbon fibers has an extremely low coefficient of thermal expansion (substantially comprised between 3° and $4° \times 10^{-7°}$ $C.^{-1}$), which enables optimisation of the reference sample performance along one main direction which is coincident with that of measurement.

The surface coating treatment in the areas of contact with the measurement apparatus, which is performed by adding ceramic oxides or pure graphite, must be such as to confer a high hardness (HRc=64) to these surfaces.

In general, the blocks of the shown reference samples are prepared employing prepregs of the Tenax type or texipregs, i.e. fibres incorporated within the cured resin and wherein curing agent is contained, with a verified contents of resin comprised between 40 and 50%, preferably near to 45% by weight. The block of composite material is provided of uni-directional features with a symmetrical and balanced structure, obtained by superimposing pre-pregs having a thickness around 0.15 mm, overlying one another with different angles of orientation of the fibres (0°, ±20°, ±30°, ... 90°).

The thermal-physical action of pressure and temperature determinates the hardening of the pre-pregs. During the production cycle the steps of deposition and of curing are essentially distinct from each other. During the deposition step the fibre layers contained in the pre-pregs are positioned according to the desired pattern and optimised in order to obtain the desired physical properties. In the second phase the resin is cured and the block takes its final shape.

In order to obtain the desired thickness, for example about 9 mm, the blocks of cured material having a thickness around 4,5 mm are joined together by means of mechanical glueing with a thermosetting material.

The curing cycle is carried out within a pressurised tank under a pressure of 8–9 bar and following three subsequent thermal steps: heating up to 120° C. at a rate of about 4° C./1'; maintaining a constant temperature of 120° C. for 90' under 8 bar; and cooling at the same rate.

The control of the thermal expansion coefficient is performed by means of known interfermetric laser measurements with a sufficient resolution (about $10^{-8}$ m/m).

The calculation of the thermal expansion coefficient is based, following conventional methods, upon the theory of elasticity of multilayered composite plane laminated bodies (theories of Halpin and Pagano; Duhamel-Neumann expression of the Hook's law).

The elastic features of the composite are summarised in the following:

|  | E [GPa] | v |
| --- | --- | --- |
| Carbon fibres | 390 | 0.2 |
| Epoxy matrix | 3.5 | 0.35 | wherein:

E=Young's modulus;

v=Poisson's Modulus.

While the structure of the composite material (epoxy resin-carbon fibres) should be considered as the preferred one, the reference samples adapted to be employed in the measurement method according to the invention may be made of different materials having a low coefficient of thermal expansion, such as for instance metal materials designated as "INVAR" (alloys with nickel contents of about 37%), quartz or other composite materials.

It will be apparent from the foregoing that the measurement method according to the invention, which is adapted to be carried out both for laboratory metrological purposes and within production environments for the quality control of products, enables the performing of extremely accurate and reliable dimensional checking, without any need of controlling the environmental temperature.

What is claimed is:

1. A method of measurement, comprising the steps of providing a piece to be checked and a comparison sample, measuring a dimensional entity of the piece to be checked and a corresponding dimensional entity of the comparison sample so as to obtain respective measured values, and comparing said measured values therebetween so as to detect a deviation value, if any, the comparing step being affected by the environmental temperature, wherein the comparison sample is made coherent with the piece to be checked and has substantially the same thermal expansion coefficient, and further comprising the following steps:

providing a reference sample constituted by a material having a low thermal expansion coefficient, substantially negligible along the direction of the dimensional entity to be measured, measuring a dimensional entity of said reference sample corresponding to said dimensional entity of said comparison sample, so as to obtain a substantially absolute measurement value, comparing said substantially absolute measurement value with said measured value of said comparison sample, and determining from the comparison a parameter which is indicative of the relative thermal expansion, employing said parameter for correcting said deviation value, if any, between the values of the measured dimensional entities of the piece to be checked and of the comparison sample, respectively.

2. A method according to claim 1, wherein the reference sample is constituted by a composite material body including a polymeric resin matrix and layers of stratified carbon fibers having different orientation angles between adjacent layers.

3. A method according to claim 2, wherein the resin is epoxy resin.

4. A method according to claim 2, wherein said body of the reference sample is subjected to a coating treatment for the surface hardening thereof.

5. A method according to claim 4, wherein the coating treatment consists of a ceramic material coating.

6. A method according to claim 4, wherein the coating treatment consists of a fluorocarbon resin coating.

7. A reference sample having a low thermal expansion coefficient to be used for carrying out the method according to claim 1, comprising a composite material body including a polymeric resin matrix and stratified carbon fibers layers having different orientation angles between adjacent layers.

8. A reference sample according to claim 7, wherein the resin is epoxy resin.

9. A reference sample according to claim 7, wherein the body is subjected to a coating treatment for the surface hardening thereof.

10. A reference sample according to claim 9, wherein the coating treatment consists of a ceramic material coating.

11. A reference sample according to claim 9, wherein the coating treatment consists of a fluorocarbon resin coating.

12. A reference sample according to claim 7, wherein the contents of resin is comprised between 40 and 50% by weight.

13. A reference sample according to claim 7, wherein the body has a symmetrical and balanced structure formed by superimposing prepreg layers having a thickness comprised between 0.1 and 0.2 mm, preferably of, superimposed to one another with fibers having different orientation angles, substantially about ±10° between each adjacent layer.

14. A reference sample according to claim 7, having a coefficient of thermal expansion substantially comprised between 3 and $4 \times 10^{-7}$ ° $C.^{-1}$.

* * * * *